United States Patent
Johnsson et al.

(10) Patent No.: US 8,811,208 B2
(45) Date of Patent: Aug. 19, 2014

(54) METHOD AND APPARATUS FOR REDUCING POWER CONSUMPTION IN A TELECOMMUNICATION NETWORK

(75) Inventors: Andreas Johnsson, Uppsala (SE); Catalin Meirosu, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 149 days.

(21) Appl. No.: 13/323,081

(22) Filed: Dec. 12, 2011

(65) Prior Publication Data

US 2012/0147768 A1 Jun. 14, 2012

Related U.S. Application Data

(60) Provisional application No. 61/422,318, filed on Dec. 13, 2010.

(51) Int. Cl.
 *H04J 1/16* (2006.01)

(52) U.S. Cl.
 USPC .......................................... 370/252

(58) Field of Classification Search
 None
 See application file for complete search history.

(56) References Cited

U.S. PATENT DOCUMENTS

| 2006/0125422 | A1* | 6/2006 | Costa | 315/294 |
| 2008/0137659 | A1* | 6/2008 | Levy-Abegnoli et al. | 370/392 |
| 2009/0217065 | A1* | 8/2009 | Araujo, Jr. | 713/320 |
| 2011/0252248 | A1* | 10/2011 | Cameron et al. | 713/300 |

* cited by examiner

*Primary Examiner* — Chirag Shah
*Assistant Examiner* — Rina Pancholi
(74) *Attorney, Agent, or Firm* — Rothwell, Figg, Ernst & Manbeck, P.C.

(57) ABSTRACT

A method that reduces the power consumption on network nodes by taking into account the services that need to be supported by the network and the power saving capabilities of the nodes.

17 Claims, 10 Drawing Sheets

300

| Power state | Throughput CPU | Throughput device IF 1 |
|---|---|---|
| P₁ | 50 | 50 |
| P₂ | 65 | 60 |
| Pₓ | 80 | 85 |
| Pₙ | 100 | 100 |

FIG. 3

METHOD AND APPARATUS FOR REDUCING POWER CONSUMPTION IN A TELECOMMUNICATION NETWORK

This application claims the benefit of U.S. Provisional Patent Application No. 61/422,318, filed on Dec. 13, 2010, the entire contents of which is incorporated by reference herein.

TECHNICAL FIELD

The present invention relates to methods and apparatuses for reducing power consumption in a network.

BACKGROUND

Modern processors present in devices such as computers, smartphones, etc. have capabilities allowing them to adjust the clock frequency depending on the processing load. Also, multi-core processors allow for some of the cores to perform calculations at regular speeds while others are kept in a low-powered sleep mode until their contribution is required by the overall load of the system (for example, in the Tilera TileGX family). Network processors that take care of the packet forwarding function in switches and routers are also based on multicore designs (for example, the Cavium Octeon and the Xelerated HX). However, it was not possible to determine what power saving features is incorporated in these network processors, based solely on publicly available information.

The P802.3az standard proposal, based on the investigation started by the IEEE 802.3 Energy Efficient Ethernet Working Group, introduces three power states for the Ethernet PHY: full, low power idle, off. The Energy Efficient Ethernet workgroup at IEEE is evaluating technologies that would allow Ethernet bridges to reduce their power consumption by introducing a low-power idle mode for the PHY component when there is no traffic to be sent. Low power modes for Ethernet controllers (that is, allowing for power savings beyond the PHY chip) were suggested by D. Koenen in 2007, Potential Ethernet Controller Power Savings, www.ieee802.org/3/ee-e_study/public/may09/koenen_1_0507.pdf.

The Broadband Forum TR-202, TR-202 ADSL2/ADSL2plus Low-Power Mode Guidelines, Broadband Forum, February 2010 defines three power states for ADSL equipment (L0 full power, L2 low power, L3 no signal with the transceiver either powered or unpowered).

Academic proposals such as the ClickCAM research proposes techniques to reduce the power consumption of particular chips on a switch/router linecard (the TCAM, in this particular case), Exploring Router Power Performance Tradeoffs Using Click.

An overall solution for energy minimization at the network node was proposed by Bolla et al, GreenSim: An Open Source Tool for Evaluating the Energy Savings through Resource Dynamic Adaptation, Raffaele Bolla et al. The authors constructed an energy consumption model for a PC-based multicore router and devised a method to optimize the energy consumption taking into account the traffic passing through the device. The solution proposed by Bolla et al. relies on ACPI calls that enable the equipment to switch between power conservation modes. Such a solution is clearly limited to routers based on multi-core processors that support ACPI calls. Also, their model includes a simple node-based traffic estimator. However, in practice, such a traffic estimator is quite energy-hungry to operate on each network node (CPU time and memory occupancy). Also, such a traffic estimator is complicated at the network node level to implement in a carrier network that supports multiple classes of services.

In US2009089601 a power saving mechanism on GMPLS controlled networks is described. The consumption is reduced by cutting power consumption on spare paths that are not normally used. To achieve power consumption reduction, in the path setting process, a path is calculated while taking the power saving capability of each interface into account, and the applicable interface is set to the power-saving state when setting the spare path. When the spare path was set to the operating state, then the power-saving state on the applicable interface was canceled so that interface could operate normally. The power reduction strategy described is clearly limited and only considers shutting down paths that are not in use. A finer granularity of power state updates is required. Further, not only GMPLS-based networks must be considered.

The Resource Reservation Protocol (RSVP) is a network-control protocol that enables Internet applications to obtain differing qualities of service (QoS) for their data flows. Such a capability recognizes that different applications have different network performance requirements. There exist extensions to RSVP, such as RSVP-TE which allow the operator to traffic engineer the network.

On the radio network side, the power saving features in a base station is discussed at length in WO2009031955. Of particular interest to is the mention that a base station has several transmitters (TRX), and using power-management algorithms some of them could be put temporarily in a stand-by mode thus saving energy.

In summary, according to prior art, network nodes include capabilities that allow reducing the power consumption depending on the level of traffic and/or operator policies. Known power saving schemes includes various degrees of flexibility with respect to the amount of power savings to be expected. For multi-core network processors, it is possible to reduce the clock speed and shut down individual cores (Tilera GX being an example). Ethernet PHY chips will support P802.3az features and potentially operate in three different power modes (on, idle, off). For other components, such as the TCAMs, academic contributions such as ClickCAM suggested ways to build them in ways that enable energy-efficient operating modes.

The Metro Ethernet Forum is working on a series of specifications that describe Ethernet connectivity services. Such Service Level Specifications include the specification of bandwidth profiles and support for protection switching features (MEF 6.1 describes Service Definitions, MEF 10.2 specifies Service Attributes). Ongoing work in IETF supports the automated provisioning of such services over GMPLS networks (draft-ietf-ccamp-gmpls-mef-uni).

The authors of JP 2009147615 disclose a method for controlling the energy consumption of the router based on bandwidth reservations made via messages transmitted with the RSVP protocol. The authors describe a system that is able to reduce the clock frequency of the chip and control the power supply voltage provided to the chips in accordance to pre-defined resource reservations. The solution proposed by JP 2009147615 is addressing only pre-reserved resources and it does not take into account that those resources might be used at less than the maximum capacity during normal system operation. As such, the solution proposed is inefficient with respect to the actual energy savings that could be achieved during operation. Also, presented is an individual node-centric view and does not extend or correlate the savings at a network level. The solution presented does not allow the operator to control what level of savings should be achieved by each node. In terms of practical implementations, the suggestions to reduce the clock frequency and the power supply voltage for the packet processing unit cover only some of the potential cases, and are by no means universal applicability. For example, Ethernet PHY chips supporting P802.1az would be able to shut down parts of the chip (except the low power idle circuitry) while not necessarily being able to control neither the clock frequency nor the power supply voltage. Also, the solution disclosed does not make it very clear what happens when a certain network port supports multiple resources which would be reserved through unrelated RSVP sessions.

Anecdotic evidence suggests that switches and routers operate at maximum capacity regardless on the traffic generated by the services being supported at a given moment in time. Technology exists that would allow individual components on the switch/router linecard to be switched off temporarily, or put in low power consumption modes when there is no traffic. However, such individual solutions are unlikely to optimize the overall power consumption of the node or the path, and are likely to operate in an uncoordinated way which might cause problems (such as packet loss, or increased transmission times).

The solutions according to the prior art are thus associated with a plurality of drawbacks.

SUMMARY

Proposed is, among other things, a method that reduces the power consumption on network nodes by taking into account the network services that need to be supported by the network and the power saving capabilities of each node and it's components. Each network service may be described through a Service Level Specification document that specifies the QoS and availability parameters associated to the service.

In one aspect, a green controller, which may be arranged at each node, may modify the power state of a node in such a way that the node can handle the already provisioned network services as well as newly provisioned network services. In some embodiments, a power policy maps power states to a "resource occupancy" of one or several components of the node. For example, if the component of the node is a component that transmits data, the resource occupancy may be a value corresponding to the components bandwidth utilization; if the component is a processor, then the resource occupancy may be the number of active processor cores and operating frequency; and if the component is a data storage component (e.g., volatile memory) then the resource occupancy may be a value corresponding to storage utilization. By keeping the power state as low as possible, but still high enough for serving the already provisioned network services, power consumption may be lowered.

The power consumption may be coordinated via a control plane as well as autonomic functionality in the network nodes.

In another aspect, there is provided a method for handling power consumption in nodes in a communication network, the network comprises a plurality of nodes connected via paths, a path computation engine (PCE) and a self-organizing network (SON) module. In some embodiments, the method comprises some or all of the following steps to be performed in the SON Module: (a) transmitting to the PCE a message requesting a path based on e.g. topology, capacity and reserved resources of the network; (b) receiving from the PCE the requested path information; (c) for each node in the path, transmitting to the node a control plane message that causes the node to change the power state of a component of the node (or the node itself) in accordance with a power policy and the level of services that the component (or node) has to provide.

In another aspect, there is provided a method for handling power consumption in nodes in a communication network, where the network comprises a plurality of nodes connected via paths, a PCE and a SON Module. In some embodiments, the method comprises some or all of the following steps to be performed in a network node: (a) receiving from the SON module power policies; (b) receiving a particular message from the SON Module (e.g., an instruction from a SON module to change power states of the components of the node); (c) in response to receiving the particular message, comparing and correlating the power states with the level of services that the node has to provide; (d) modifying the power state based on actual utilization of services the node has to provide and policies obtained from the SON module.

In another aspect, there is provided a method for conserving power in a network comprising a network node. In some embodiments, the method includes: (a) receiving, by the network node, a power policy; (b) determining a utilization of a component of the network node; and (c) modifying the power state of the component of the network node based on the determined utilization of the component and the received power policy. In some embodiments, the method further comprises, receiving by the network node, a particular message transmitted from another network node (e.g., a SON module or other network node), and the steps (b) and (c) are performed in response to the network node receiving the particular message.

In some embodiments, the particular message is a resource reservation request message transmitted from another network node, the resource reservation request message identifying a data flow and a desired quality of service for the data flow. The power policy may map different power states to different utilization values. In some embodiments, step (b) comprises: (bi) determining a value representing the utilization of the component, (bii) using the power policy to determine a power state to which the determined utilization value is mapped, and (biii) causing the power state of the component to be set to the determined power state.

In some embodiments, the step of determining the utilization of the components comprises determining the amount of resources the component is using or the amount of resources that have been reserved for use.

The method may further include: (c) determining a utilization of a second component of the network node and (d) causing the power state of the second component of the network node to be modified based on the determined utilization of the second component and the received power policy, where steps (c) and (d) are also performed in response to the particular message. The first component may be an interface of the network node and the second component may be a routing or switch module of the network node.

In another aspect, a network node with a power conserving capability is provided. In some embodiments, the network node includes: a network interface for transmitting and receiving data; and a data processing system coupled to the network interface, the data processing system being configured such that, in response to the network node receiving a particular message, the data processing system performs a process comprising: (a) determining a utilization of a component of the network node and (b) causing the power state of the component of the network node to be modified based on the determined utilization of the component and a received power policy.

The above mentioned methods and apparatuses provide a way of reducing power consumption in networks. No central understanding on how to set power consumption parameters is required. However, the operator is given the option to control through a policy system to what extent a particular node along a given path should enable energy saving features. The methods and apparatuses may also allow for network-wide coordination of energy savings.

The methods and apparatuses allow a network system to automatically adapt the power consumption according to the actual amount of resource consumption, rather than just using pre-defined resource reservations. In addition, it allows for transparent support of energy saving for multiple connectivity services on the same network interface. Embodiments do not require changes to state-of-the-art resource reservation protocols.

Further features and advantages are described herein.

BRIEF DESCRIPTION OF THE DRAWINGS

Reference will now be made, by way of example, to the accompanying drawings, in which:

FIG. 3 illustrates a mapping between power states and throughput utilization.

DETAILED DESCRIPTION

Figure 1:
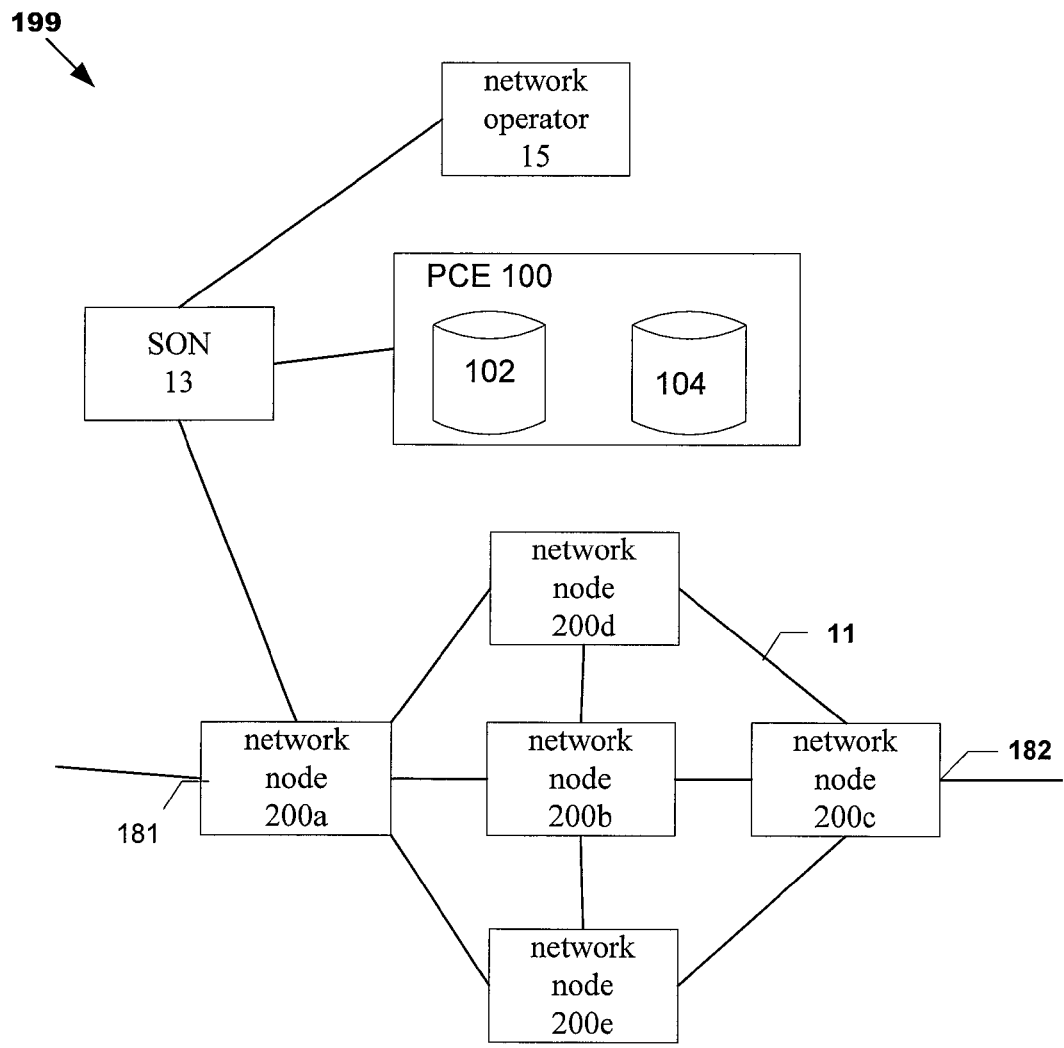
FIG. 1 illustrates a network according to an embodiment.

FIG. 1 illustrates a network 199 according to some embodiments. Network 199 includes: a plurality of network nodes 200 connected via links 11, a path computation engine (PCE) 100 and a self-organizing network (SON) module 13. FIG. 1 schematically illustrates PCE 100. PCE 100 contains topology information and capacity information 102 pertaining to network topology and network capacity and reserved resources information 104 pertaining to reserved resources. Traditionally a path is determined by utilizing network topology and capacity information 102 in combination with resource information 104 identifying resources that are already reserved using Dijkstra's algorithm (or various versions and extensions to it) for calculating the path (point-to-point, point-to-multipoint or multipoint-to-multipoint). The network topology information 102 contains details about devices and links in network 199 and their properties. In response to receiving a request for a path, PCE 100 determines a path given data and constraints provided by the network topology and capacity and reserved resources blocks. The path is returned in a PCE 100 response message.

SON module 13 acts as a proxy between a network operator 15 of network 199 (or other entity capable of operating the network) and the network itself. It is responsible for obtaining paths from PCE 100 as well as triggering RSVP messages at ingress and egress nodes.

RSVP is the traditional resource reservation protocol in the IP world. For example, the extension RSVP-TE is used for setting up optical paths based on MPLS. Embodiments of the present invention are exemplified herein utilizing RSVP. The control protocol is used as an example on how to provision paths and set power parameters.

Figure 2:
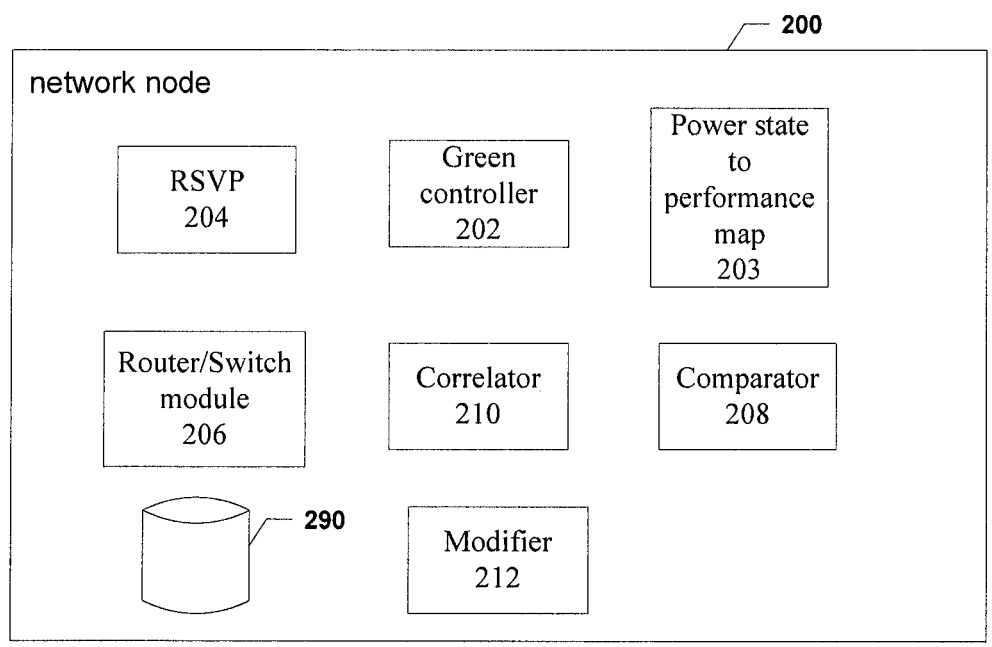
FIG. 2 is a functional block diagram of a network node according to an embodiment.

FIG. 2 illustrates a functional block diagram of an exemplary network node 200. Network node 200 may be an ingress node, an intermediate node, or an egress node in a communication network. Node 200 may have routing and/or switching capabilities, and, thus, in some embodiments, network node 200 may be referred to as a network router or a network switch. As shown in FIG. 2, node 200 includes a green controller 202, a power state to performance map 203, an RSVP module 204, a routing and/or switching module 206, a comparator 208, a correlator 210, and a modifier 212.

The power state to performance map 203 contains a mapping between maximum allowed power states and performance parameters such as throughput utilization (e.g., a table that associates each of a plurality of different power states with one or more throughput values associated with a component of node 200). An example of this mapping is illustrated in FIG. 3, which illustrates an exemplary mapping 300. As shown in mapping 300, a given power state provides a certain maximum throughput for a specific line card or interface. This mapping may be provided for network node 200 as a whole as well as for all its line cards and interfaces and other components. The mapping is preferably pre-determined, that is before the network becomes operational. Means for performing such tests include startup tests (e.g. ITU-T Y.156sam, on Ethernet Service Activation Test Methodology) performed by network element vendors. Such a maximum power state could be altered during network operations by green controller 202 depending on actual network utilization.

Green controller 202 is responsible for keeping track of already reserved resources between any interfaces. In some embodiments, each time a resource reservation request (or a reservation teardown request) arrives at node 200, green controller 202 updates a resource database 290 (e.g., a resource table) to reflect the current resource state of node 200. The already reserved resources can also be synchronized and verified by contacting PCE 100. Further, green controller 202 is responsible for changing the power state of node 200. How to change the power state and exactly which API to use is device dependent. When a particular message (e.g., an RSVP reservation request message—a.k.a., RSVP RESV message) is received at network node 200, green controller 202 performs a process for changing the power state of node 200 (e.g., changing the power state of one or more components of node 200).

Figure 4:
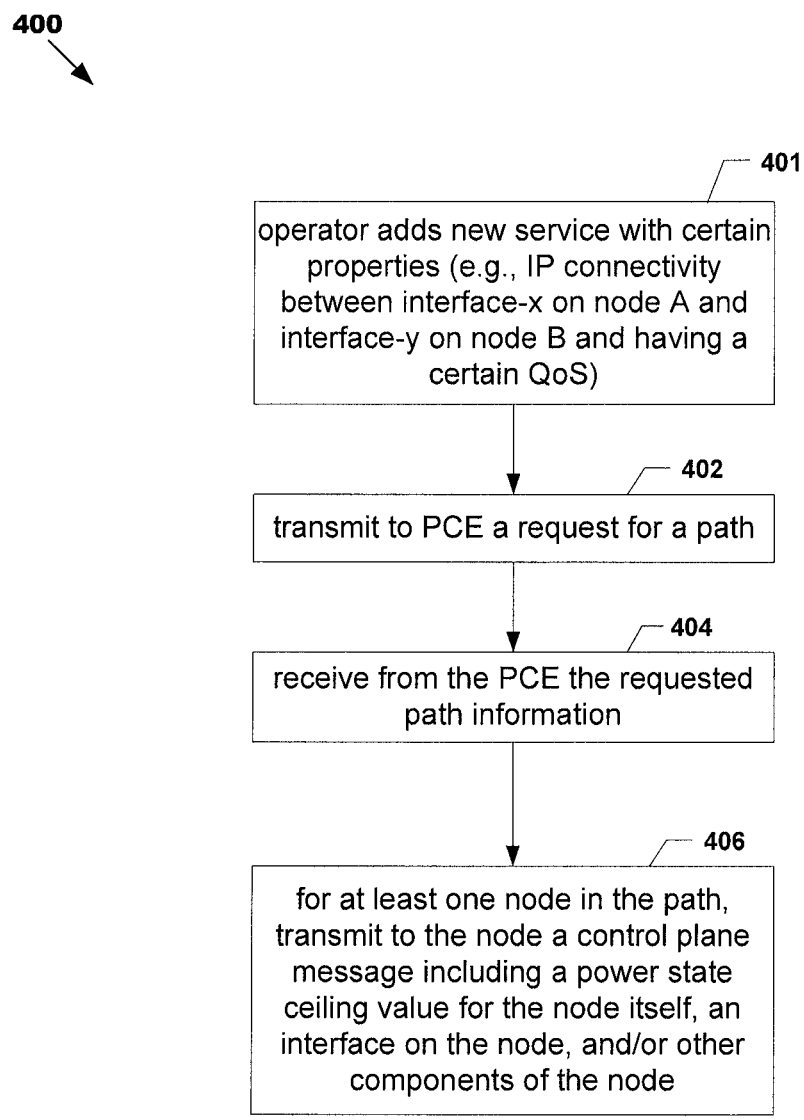
FIGS. 4-7 are flow charts illustrating various processes according to embodiments.

FIG. 4 is a flow chart illustrating a process 400, according to some embodiments, that is performed, in part, by SON module 13. Process 400 may begin in step 401, where an operator wants to add a new service to the network. For example, the operator may want to add a new IP connectivity service between interface 181 on node 200a and interface 182 on node 200c having a certain quality of service (QoS). Thus, the operator may use an admin tool to define the service, which admin tool may then send to SON module a provision service message.

In step 402, in response to receiving the provision service message, SON module 13 transmits to PCE 100 a message requesting a path based on the provision service message. In step 404, SON module 13 receives from PCE 100 the requested path information. The path information may identify a set of one or more nodes and, for each identified node, one or more interfaces on the node. In step 406, for at least one node in the path, SON module transmits to the node a control plane message that may include a power state ceiling value for the node itself, an interface on the node, and/or other components of the node.

Figure 5:
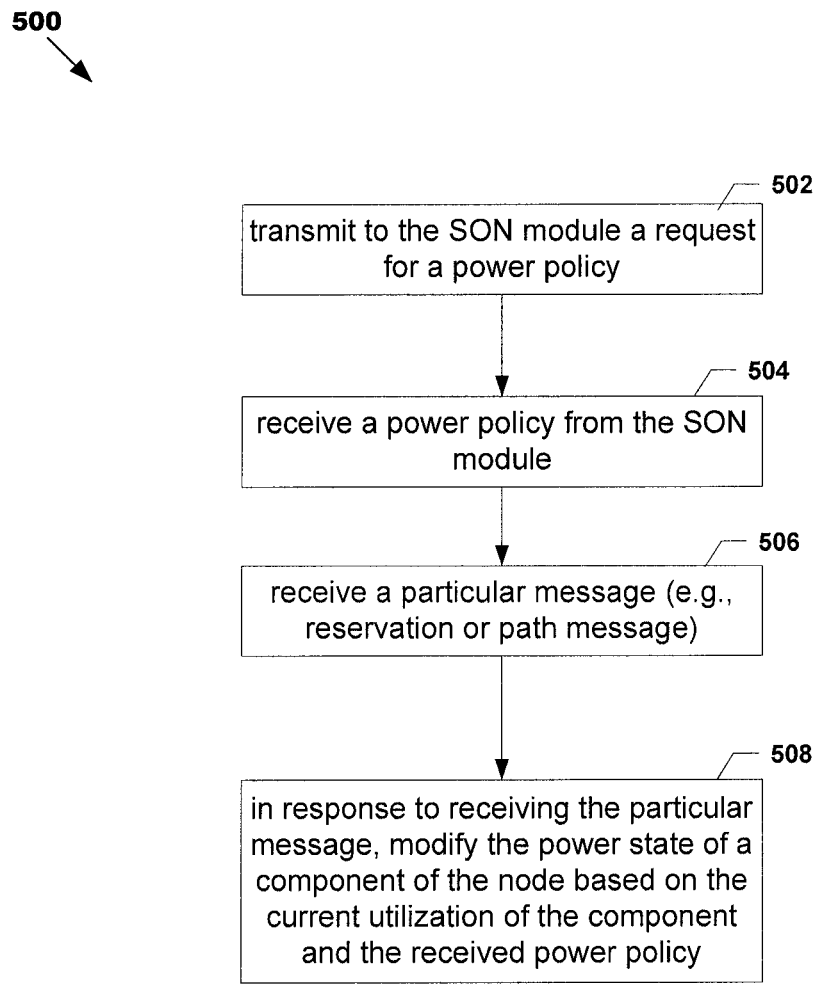

FIG. 5 is a flow chart illustrating a process 500, according to some embodiments, that is performed by a node 200.

Process 500 may begin in step 502, where node 200 transmit a power policy request to SON module 13. In step 504, node 200 receives from SON module 13 a power policy (e.g., map 300). In step 506, node 200 receives a particular message. In some embodiments, the particular message is a message including a instruction instructing the network node to change power states of the components of the node. In other embodiments, the particular message is a path message (e.g., an RSVP Path message) or a reservation request message (e.g., RSVP Resv message). In step 508, in response to receiving the particular message, node 200 modifies the power state of a component of node based on the current utilization of the component (e.g., the amount of resources the component is using or the amount that has been reserved for use) and a power policy obtained from the SON module. For example, the power policy may map power states to utilization values. Thus, in step 508, for example, node 200 may determine a value representing the utilization of a component, consult the received power policy information to determine the power state to which the determined utilization value is mapped, and set the power state of the component to the determined power state.

Figure 6:
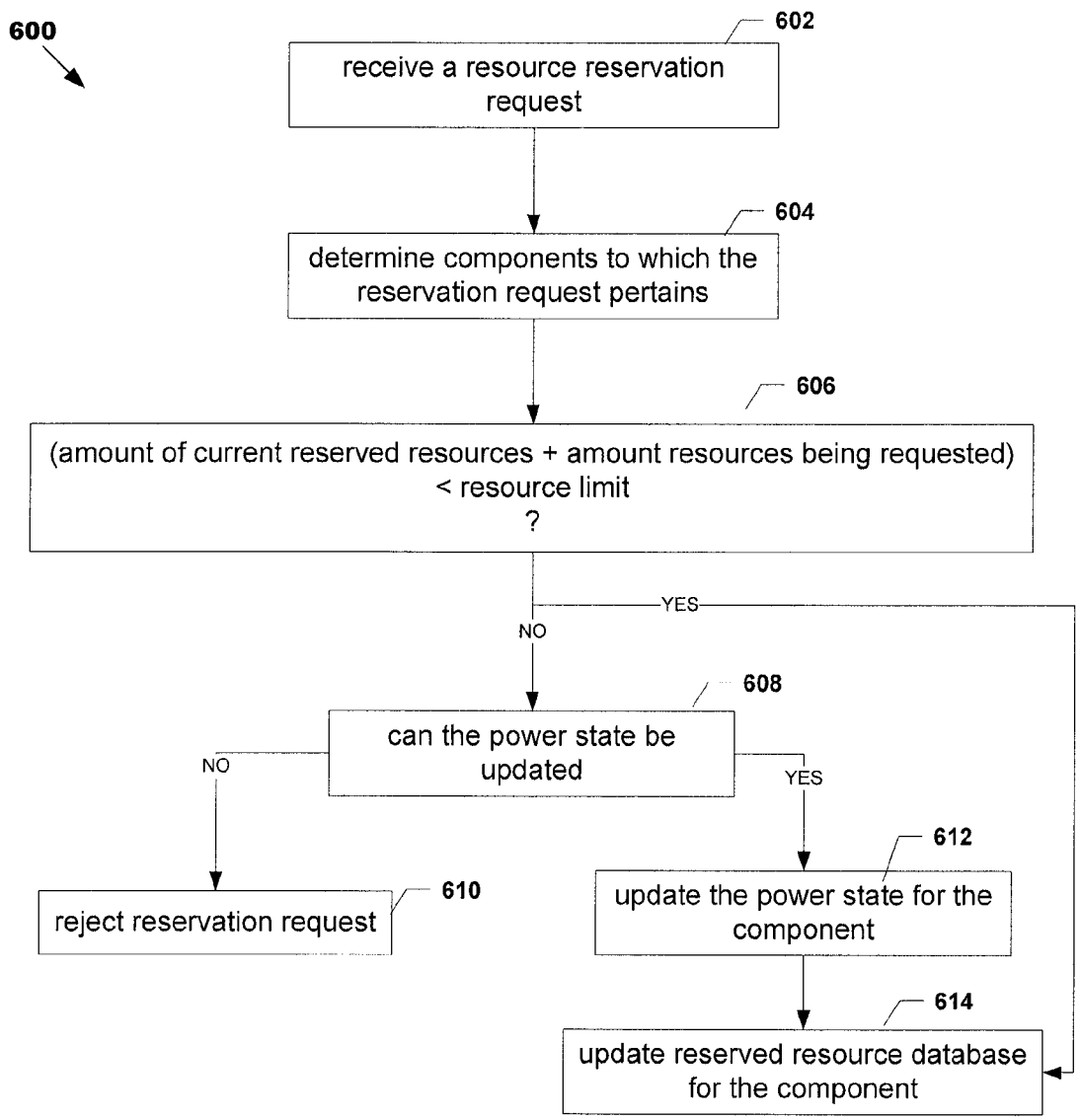

Referring now to FIG. 6, FIG. 6 is a flow chart illustrating a process 600 performed by green controller 202 in response to node 200 receiving a resource reservation request message (e.g., an RSVP Resv message). In some embodiments, the resource reservation request message includes information identifying a data flow (e.g., an RSVP Tspec) and a desired quality of service for the data flow (e.g., an RSVP flowspec).

Process 600 may begin in step 602, where node 200 receives the resource reservation request.

In step 604, green controller 202, based on the reservation request, determines the component (e.g, line card, interface) to which the resource reservation request pertains.

In step 606, for a component impacted by the reservation request, green controller 202 checks if the amount of currently reserved resources for the component plus the amount of the resources being requested for reservation by the resource reservation request is less than a resource limit (e.g., throughput limit) for the current power state for the involved component. If, the answer is no, the process proceeds to step 608, otherwise it proceeds to step 614.

In step 608, green controller 202 determines whether the power state can be updated (e.g., green controller 202 determines whether the power state is already at its maximum level).

In response to determining that the power state cannot be updated, green controller 202 rejects the reservation request according to the resource reservation protocol (step 610).

In response to determining that the power state can be updated, green controller 202 updates the power state for the interface and/or line card to the minimum power state that is capable of handling the new request (step 612).

In step 614, green controller 202 updates a reserved resource database 290 so that the database will contain information identifying the new resource usage. Therefore, resource reservations for multiple services are supported transparently along the same interface.

Steps 606-614 are performed for each of the interfaces and/or line cards impacted by the reservation request.

In addition, as stated above, green controller 202 is also responsible for dynamic changes to the power states dependent on the resource utilization on node 200. The utilization may be measured by counting the sum of bits in transfer for each reserved resource. Using the mapping between power states and throughput, green controller 202 changes the power state to the one appropriate for the level of utilization.

For example, if the current power state for interface IF1 is Pn and the measured utilization (e.g., measured throughput) is 65, then, based on mapping 300, green controller 202 can update (e.g., lower) the power state from Pn to P2 because mapping 300 indicates that P2 is the minimum amount of power that is needed to handle a throughput of 65.

The interaction with PCE 100 allows the operator to set policies that control power state savings on each node along a given path. As there are always costs (in terms of time for reaction, for example) related to any transition between power states, the operator might thus specify that certain nodes along a path that have lower capabilities in this respect would have to operate at their maximum power regardless of the actual state of resource reservation.

Figure 7:
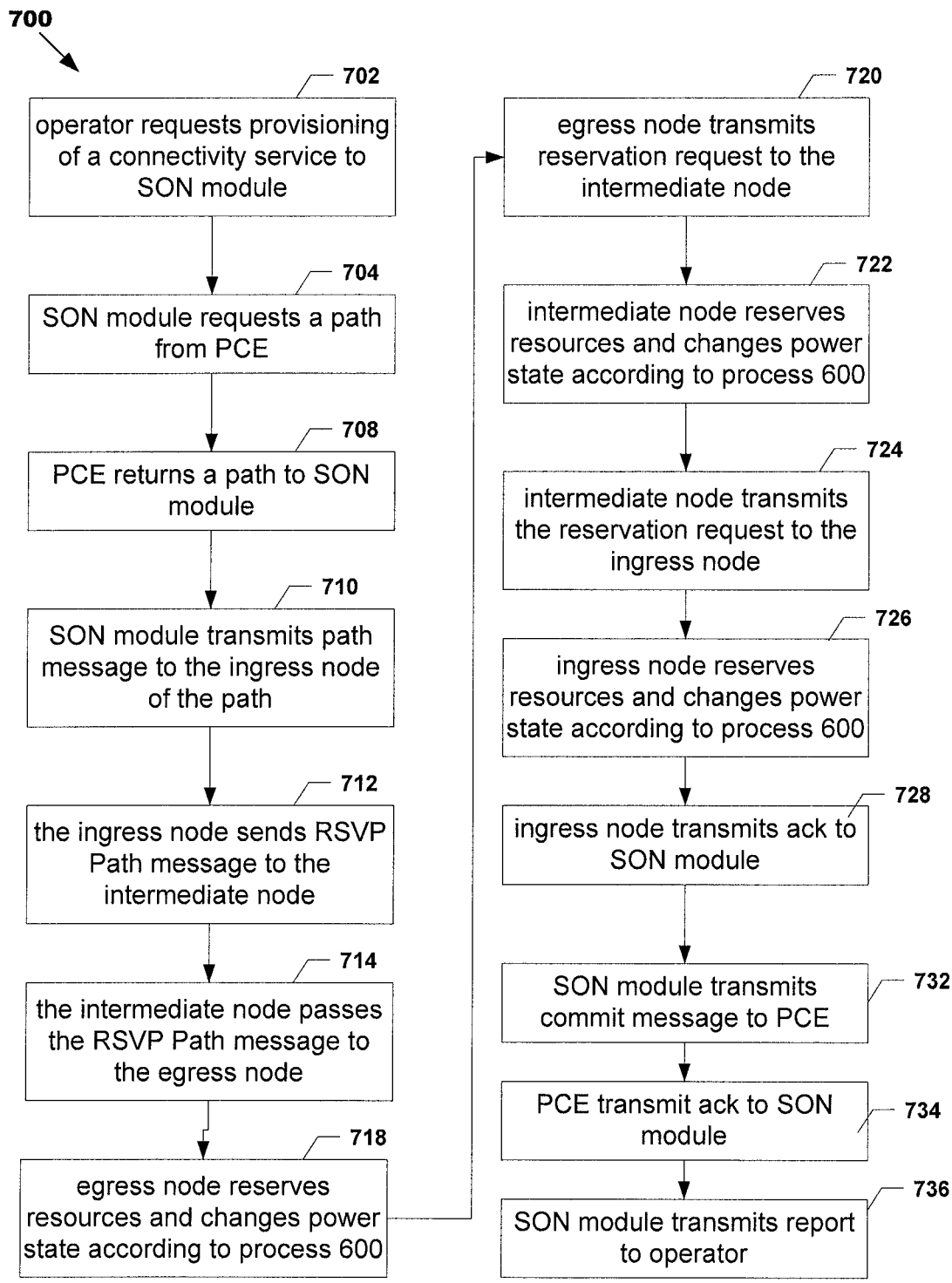

FIG. 7 is a flow chart illustrating a process 700 according to an embodiment.

Figure 8:
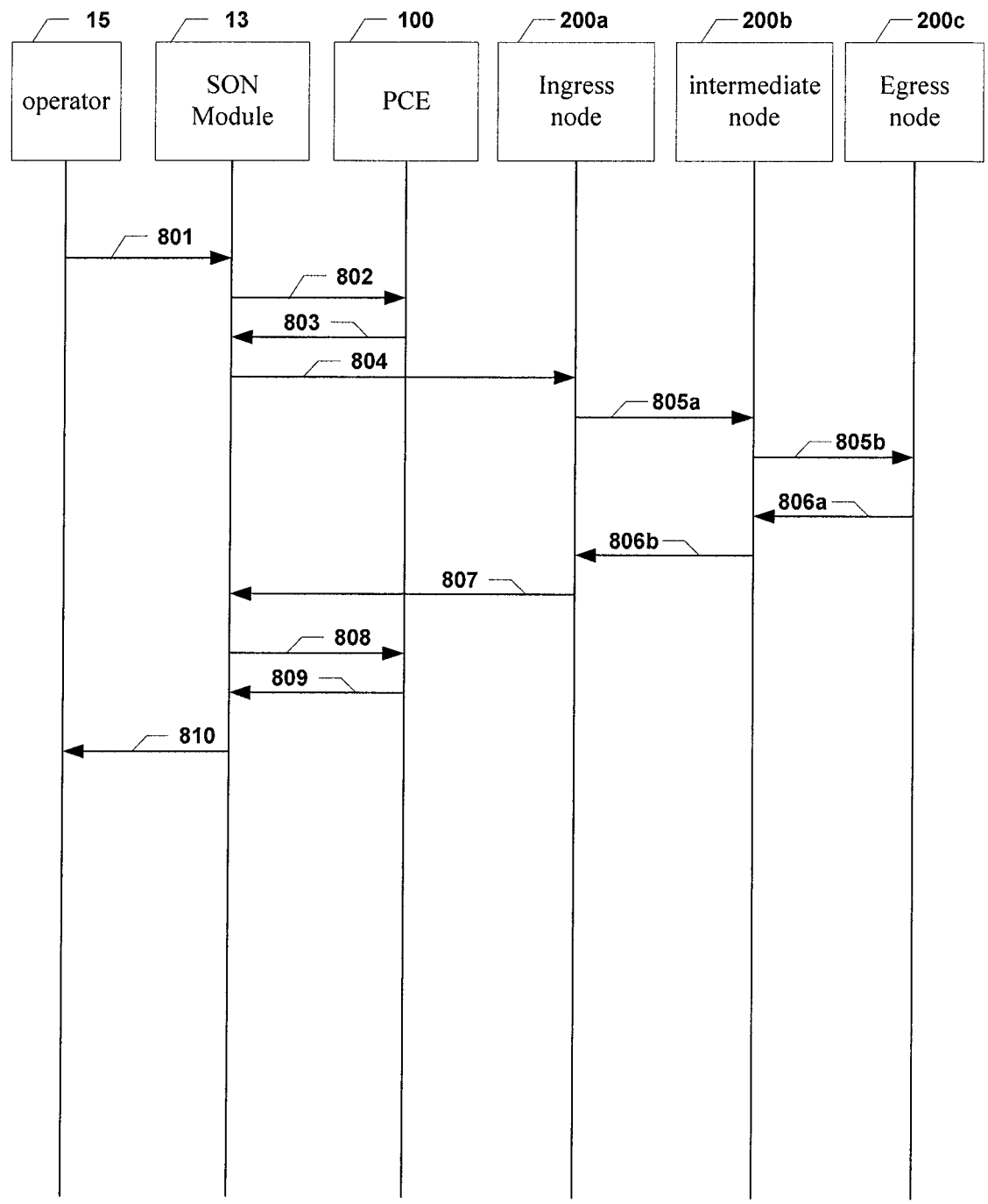
FIG. 8 illustrates a signalling diagram for reserving resources and setting power states.

Process 700 may begin in step 702, where an operator 15 (see FIG. 8) requests provisioning of a connectivity service to SON module 13 (e.g., the operator causes a provision service message 801 to be sent to SON module 13).

In step 704, SON module 13 module requests a path from PCE 100, which fulfils the connectivity service performance requirements in terms of, for example, capacity. For example, in step 704, SON module 13 transmits a request message 802 to PCE 100.

In step 708, in response to receiving request message 802, PCE 100 returns a path to SON module 13. For example, PCE 100 transmits to SON module 13 a message 803 containing information identifying a path and identifying changes to power states for each node in the path. In this example, we will assume that the path includes three nodes: an ingress node 200a, an intermediate node 200b, and an egress node 200c.

In step 710, in response to receiving message 803, SON module 13 transmits an path start message 804 to ingress node 200a. In one embodiment, path start message 804 contains path information only. In another embodiment, path start message 804 contains path information and power state information. For example, in some embodiments, for each interface on the path, the power state information may include power state information for the interface. Additionally, the power state information may include power state information for each node itself on the path.

In step 712, in response to path start message 804, ingress node 200a transmits a path message 805a (e.g. an RSVP Path message) to the intermediate node 200b.

In step 714, in response to message 805a, intermediate node 200b passes a path message 805b to egress node 200c.

In step 718, in response to receiving message 805b (assuming the request is not rejected), egress node 200c reserve resources according to path message 805b, and changes the power states according to the process 600 described above.

In step 720, egress node 200c transmits an reservation request message 806a (e.g., an RSVP Resv message) to intermediate node 200b.

In step 722, in response to receiving and processing message 806a, intermediate node 200b reserve resources according to the request, it also changes the power states according to the process 600 described above.

In step 724, in response to message 806a (assuming the request is not rejected), intermediate node 200b transmits a reservation request message 806b to ingress node 200a.

In step 726, in response to receiving and processing message 806b, ingress node 200a reserve resources according to the request, it also changes the power states according to the process 600 described above.

Path message 805*a,b* and reservation message 806*a,b* may include the power state information (or a portion thereof) that was included in path start message 804, if any. In such embodiments, the power state information may identify a power state value and the nodes (ingress, intermediate and egress) may treat the power state value as a ceiling value such that the node will not set the power state to a value above the power state value communicated to it in message 805 or 806.

In step 728, ingress node 200*a* transmits to SON Module 13 an acknowledgement message 807 indicating that the reservation is completed (in the case where no errors occurred).

In step 732, in response to message 807, SON module 13 transmits to PCE 100 a message 808 that causes PCE 100 to commit the changes due to the new connectivity service.

In step 734, after committing the changes as instructed, PCE 100 transmits to SON module 13 an ack message 809.

In step 736, in response to receiving ack message 809, SON module 13 transmits to operator 800 a report message 810 reporting to operator that the connectivity service is provisioned.

Figure 9:
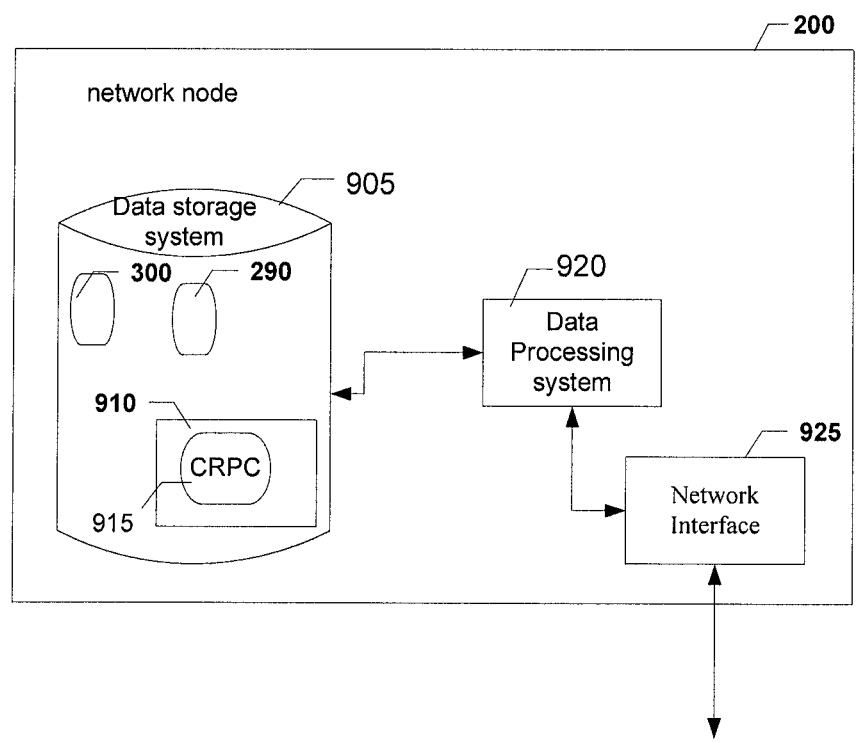
FIG. 9 schematically illustrates an a network node including some of its components.

FIG. 9 illustrates a possible implementation for at least some components of network node 200 according to some embodiments. As shown in FIG. 9, network node 200 may include: a data processing system 920, which may include one or more microprocessors and/or one or more circuits, such as an application specific integrated circuit (ASIC), Field-programmable gate arrays (FPGAs), etc; a set of network interfaces 925; data storage system 905, which may include one or more non-volatile storage devices and/or one or more volatile storage devices (e.g., random access memory (RAM)). Data processing system 930 may be used to implement modules shown in FIG. 2 (i.e., modules 202-204, 206, 208, 210, 212). In some embodiments, mapping 300 and database 290 is stored in data storage system 905. In embodiments where data processing system 920 includes a microprocessor, a computer program product may be provided, which computer program product includes: computer readable program code 915, which implements one or more computer programs, stored on a computer readable medium 910, such as, but not limited, to magnetic media (e.g., a hard disk), optical media (e.g., a DVD), memory devices (e.g., random access memory), etc. In some embodiments, computer readable program code 915 is configured such that when executed by a processor, code 915 causes the processor to perform steps described above (e.g., steps describe above with reference to the flow charts shown in FIGS. 5-7).

Figure 10:
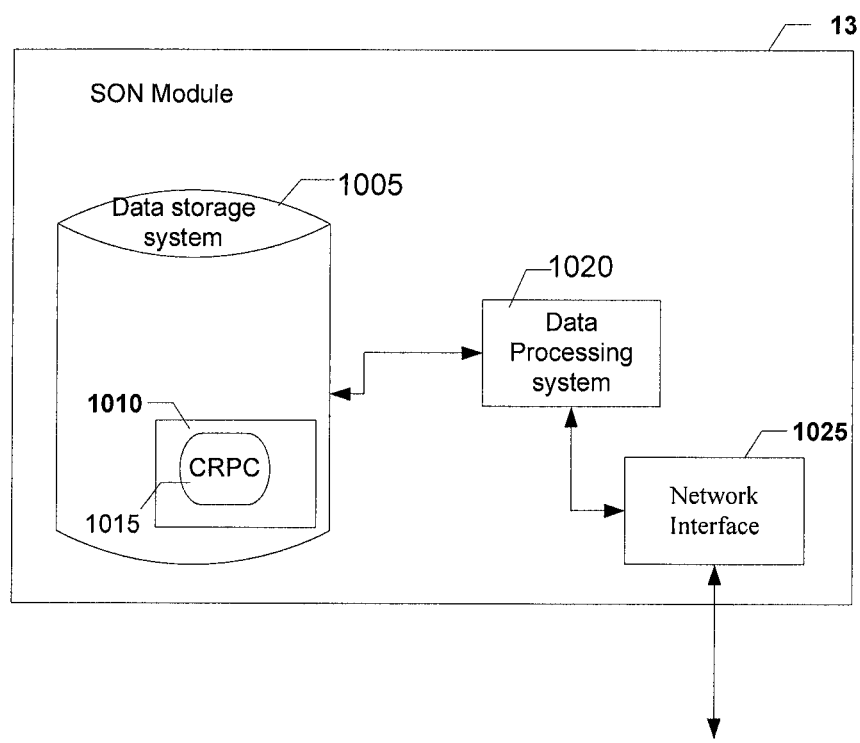
FIG. 10 schematically illustrates an SON Module including some of its components.

FIG. 10 illustrates a possible implementation for at least some components of SON module 13 according to some embodiments. As shown in FIG. 10, SON module 13 may include: a data processing system 1020, which may include one or more microprocessors and/or one or more circuits, such as an application specific integrated circuit (ASIC), Field-programmable gate arrays (FPGAs), etc; a set of network interfaces 1025; data storage system 1005, which may include one or more non-volatile storage devices and/or one or more volatile storage devices (e.g., random access memory (RAM)). In embodiments where data processing system 1020 includes a microprocessor, a computer program product may be provided, which computer program product includes: computer readable program code 1015, which implements a computer program, stored on a computer readable medium 1010, such as, but not limited, to magnetic media (e.g., a hard disk), optical media (e.g., a DVD), memory devices (e.g., random access memory), etc. In some embodiments, computer readable program code 1015 is configured such that when executed by a processor, code 1015 causes the processor to perform steps described above (e.g., steps describe above with reference to the flow chart shown in FIG. 4).

While various embodiments of the present invention have been described above, it should be understood that they have been presented by way of example only, and not limitation. Thus, the breadth and scope of the present invention should not be limited by any of the above-described exemplary embodiments. Moreover, any combination of the above-described elements in all possible variations thereof is encompassed by the invention unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A first network node with a power conserving capability, the first network node comprising:
a network interface for transmitting and receiving data; and
a data processing system coupled to the network interface, the data processing system being configured such that, in response to the first network node receiving a particular message from a second network node, the data processing system performs a process comprising:
(a) determining a first component of the first network node to which the particular message pertains;
(b) determining a utilization of the first component of the first network node; and
(c) causing a power state of the first component of the first network node to be modified based on the determined utilization of the first component and a received power policy, wherein
the power policy maps different power states to different utilization values, and
the step of determining the utilization of the first component comprises determining an amount of currently reserved resources for the first component, wherein
the particular message is a resource reservation request message transmitted from the second network node, the resource reservation request message including information identifying a data flow and a desired quality of service for the data flow,
determining the utilization of the first component comprises i) determining the amount of currently reserved resources for the first component and ii) determining an amount of resources being requested for reservation by the resource reservation request,
the process further comprises: adding the amount of currently reserved resources with the amount of resources being requested for reservation by the resource reservation request, thereby determining a total resource amount; determining whether the determined total resource amount exceeds a resource limit; and in response to determining that the total resource amount exceeds the resource limit, determining whether the current power state for the first component is currently at its maximum level, and
the step of modifying the power state is performed in response to the determination that the power state for the first component is not currently at its maximum level.

2. The first network node of claim 1, wherein the power policy maps different power states to different maximum throughput utilization values.

3. The first network node of claim 2, wherein the data processing system is configured to perform step (c) by:

(i) determining a value representing the data transmission throughput of the first component,
(ii) using the power policy to determine a power state to which the determined data transmission throughput is mapped, and
(iii) causing the power state of the first component to be set to the determined power state.

4. The first network node of claim 1, wherein the step of determining the utilization of the first component further comprises determining the amount of resources the first component is using.

5. The first network node of claim 1, wherein the process further comprises:
   determining a utilization of a second component of the first network node; and
   causing the power state of the second component of the first network node to be modified based on the determined utilization of the second component and the received power policy.

6. The first network node of claim 5, wherein the first component is an interface of the first network node and the second component is a routing or switch module.

7. The first network node according to claim 1, wherein the process further comprises transmitting a second resource reservation request message to the second network node.

8. The first network node according to claim 1, wherein the power policy is received from a third network node through the network interface and the third network node includes topology information of a plurality of network nodes including the first network node, and the topology information is used to create the power policy.

9. A method for conserving power in a network comprising a first network node, the method comprising:
   (a) receiving, by the first network node, a power policy;
   (b) determining, in response to receiving a particular message transmitted by a second network node, a component of the first network node to which a particular message pertains;
   (c) determining a utilization of the component of the first network node; and
   (d) modifying a power state of the component of the first network node based on the determined utilization of the component and the received power policy, wherein
   the power policy maps different power states to different utilization values, and
   the step of determining the utilization of the component comprises determining an amount of resources that have been reserved for use for the component, wherein
   the particular message is a resource reservation request message transmitted from the second network node, the resource reservation request message identifying a data flow and a desired quality of service for the data flow,
   determining the utilization of the component comprises i) determining an amount of currently reserved resources for the component and ii) determining an amount of resources being requested for reservation by the resource reservation request,
   the method further comprises: adding the amount of currently reserved resources with the amount of resources being requested for reservation by the resource reservation request, thereby determining a total resource amount; determining whether the determined total resource amount exceeds a resource limit; and in response to determining that the total resource amount exceeds the resource limit, determining whether the current power state for the component is currently at its maximum level, and
   the step of modifying the power state is performed in response to the determination that the power state for the component is not currently at its maximum level.

10. The method of claim 9, wherein the steps (c) and (d) are performed in response to the first network node receiving the particular message.

11. The method of claim 10, wherein the step of determining the utilization of the component further comprises determining the amount of resources the component is using.

12. The method of claim 10, further comprising:
   determining a utilization of a second component of the first network node; and
   causing the power state of the second component of the first network node to be modified based on the determined utilization of the second component and the received power policy, wherein steps (c) and (d) are also performed in response to the first network node receiving the particular message.

13. The method of claim 12, wherein the first recited component is an interface of the first network node and the second component is a routing or switch module.

14. The method of claim 9, wherein the power policy maps different power states to different maximum throughput utilization values.

15. The method of claim 14, wherein step (d) comprises:
   (i) determining a value representing the data transmission throughput of the component,
   (ii) a using the power policy to determine a power state to which the determined data transmission throughput value is mapped, and
   (iii) causing the power state of the component to be set to the determined power state.

16. The method according to claim 9, further comprising transmitting a second resource reservation request message to the second network node.

17. The method according to claim 9, wherein the power policy is received from a third network node and the third network node includes topology information of a plurality of network nodes including the first network node, and the topology information is to create the power policy.

* * * * *

UNITED STATES PATENT AND TRADEMARK OFFICE
CERTIFICATE OF CORRECTION

PATENT NO. : 8,811,208 B2
APPLICATION NO. : 13/323081
DATED : August 19, 2014
INVENTOR(S) : Johnsson et al.

Page 1 of 1

It is certified that error appears in the above-identified patent and that said Letters Patent is hereby corrected as shown below:

In The Claims

In Column 12, Line 41, in Claim 15, delete "a using" and insert -- using --, therefor.

In Column 12, Line 53, in Claim 17, delete "is to" and insert -- is used to --, therefor.

Signed and Sealed this
Seventeenth Day of March, 2015

Michelle K. Lee
*Director of the United States Patent and Trademark Office*